(12) United States Patent
Shirakawa et al.

(10) Patent No.: US 6,499,383 B2
(45) Date of Patent: Dec. 31, 2002

(54) CYLINDER ASSEMBLY

(75) Inventors: Tsutomu Shirakawa, Kobe (JP); Keitaro Yonezawa, Kobe (JP)

(73) Assignee: Kabushiki Kaisha Kosmek, Hyogo (JP)

(*) Notice: Subject to any disclaimer, the term of this patent is extended or adjusted under 35 U.S.C. 154(b) by 41 days.

(21) Appl. No.: 09/885,121

(22) Filed: Jun. 21, 2001

(65) Prior Publication Data
US 2002/0014150 A1 Feb. 7, 2002

(30) Foreign Application Priority Data
Aug. 2, 2000 (JP) .................................. 2000-234058

(51) Int. Cl.[7] ........................ F01L 15/00; F15B 13/00
(52) U.S. Cl. ................................... 91/178; 91/534
(58) Field of Search ........................... 91/533, 534, 536, 91/178

(56) References Cited
U.S. PATENT DOCUMENTS
3,824,896 A * 7/1974 Tull, III ...................... 91/533

FOREIGN PATENT DOCUMENTS
JP 6-190464 7/1994

* cited by examiner

Primary Examiner—Edward K. Look
Assistant Examiner—Michael Leslie
(74) Attorney, Agent, or Firm—Bacon & Thomas, PLLC

(57) ABSTRACT

A manifold (2) is provided with a first passage (4) for supplying pressurized oil and a second passage (5) for air venting. The manifold (2) has a support surface (9) to which a housing (12) of every hydraulic cylinder (7) is hermetically fixed through a sealing member (10). A piston (14) is inserted into a cylinder bore (13) of the housing (12). A hydraulic chamber (15) is formed between the piston (14) and the support surface (9). The hydraulic chamber (15) directly opposes to the support surface (9). The first passage (4) communicates with the respective hydraulic chambers (15) through branched passages (17). The hydraulic chamber (15) has an upper portion communicated with the second passage (5) through an air vent passage (18).

5 Claims, 4 Drawing Sheets

CYLINDER ASSEMBLY

BACKGROUND OF THE INVENTION

1. Field of the Invention

The present invention relates to a cylinder assembly comprising a large number of hydraulic cylinders.

2. Explanation of Related Art

Japanese Patent Public Disclosure No. 6-190464 recited a conventional example of the cylinder assembly of this type. The conventional cylinder assembly comprises a large number of hydraulic cylinders arranged in a horizontal direction. A housing of every hydraulic cylinder has a lower end wall fixed to a support pedestal. A hydraulic chamber is formed between a piston inserted into the housing and the lower end wall. The respective hydraulic chambers are connected to a hydraulic source via hydraulic pipes.

There has been a desire for improving the conventional technique on the following points.

Hydraulic pipes must be connected to each of the large number of hydraulic cylinders in a narrow and limited piping space, which entails a problem of troublesome piping work. Further, the hydraulic pipes require a huge quantity of joints, which invites an easy leakage of pressurized oil.

SUMMARY OF THE INVENTION

The present invention has an object to provide a cylinder assembly which facilitates the piping work and can prevent the leakage of the pressurized oil.

In order to accomplish the above-mentioned object, the present invention has constructed the cylinder assembly in the following manner, for example, as shown in FIG. 1.

There is provided a manifold 2 having a passage 4 to which pressurized oil is supplied. A plurality of hydraulic cylinders 7 are detachably attached to the manifold 2. Each of the hydraulic cylinders 7 comprises a housing 12 hermetically fixed to a support surface 9 of the manifold 2, a piston 14 hermetically inserted into the housing 12 and a hydraulic chamber 15 which is formed between the piston 14 and the support surface 9, and directly opposes to the support surface 9. The manifold 2 has an interior area provided with branched passages 17. Every branched passage 17 has one end communicated with the passage 4 and has the other end communicated with the hydraulic chamber 15.

The present invention offers the following function and effect.

When supplying pressurized oil to the plurality of hydraulic cylinders, the pressurized oil is supplied to the passage of the manifold. Then the pressurized oil is supplied to every hydraulic chamber of every hydraulic cylinder through the passage and each of the branched passages.

As such, the pressurized oil can be supplied to the hydraulic chambers through the passage and the branched passages formed within the manifold. There is no need of connecting hydraulic pipes to each of the hydraulic cylinders. This facilitates the piping work for the cylinder assembly. Further, the number of joints is decreased by an amount corresponding to the omission of the hydraulic pipes to result in the possibility of preventing the pressurized oil from leaking out of the cylinder assembly.

Additionally, the manifold has its support surface directly opposed by the hydraulic chamber within the housing. Therefore, a front wall portion of the support surface can serve as an end wall of the hydraulic chamber. This has made it possible to remove the end wall for the hydraulic chamber from the housing. As a result, the cylinder assembly can be manufactured with a simple structure at a low cost and besides facilitates the maintenance. Besides, the removal of the end wall decreases the height of the housing to result in the possibility of making the cylinder assembly compact.

The present invention includes the following cylinder assembly.

For instance, as shown in FIG. 1, the manifold 2 is provided with another passage 5 and the housing 12 has its interior area formed with an air vent passage 18. The air vent passage 18 has one end communicated with the another passage 5 and has the other end communicated with an upper portion of the hydraulic chamber 15. The invention can expel air within the hydraulic chamber to an exterior area through the air vent passage and the another passage when the pressurized oil has been supplied to the hydraulic chamber. Accordingly, it can effect air venting for every hydraulic cylinder substantially completely. This assures a reliable and smooth operation of the cylinder assembly.

The present invention further includes the following cylinder assembly.

For example, as shown in FIG. 4, the housing 12 has a cylinder bore 13 in which an annular attaching groove 46 is formed. A sealing member 45 attached to the attaching groove 46 seals the piston 14. The sealing member 45 has a lower side provided with a cavity 53, with which the air vent passage 18 communicates.

The present invention still more includes the following cylinder assembly.

For example, as shown in FIG. 4, at least one of the upper portion of the hydraulic chamber 15 and the air vent passage 18 is provided with a flow resistance applying means.

DESCRIPTION OF THE PREFERRED EMBODIMENTS

Hereafter, an embodiment of the present invention is explained based on FIGS. 1 to 4. This embodiment exemplifies a case where a cylinder assembly (A) of the present invention is applied to a die cushion apparatus of a press machine.

Figure 1:
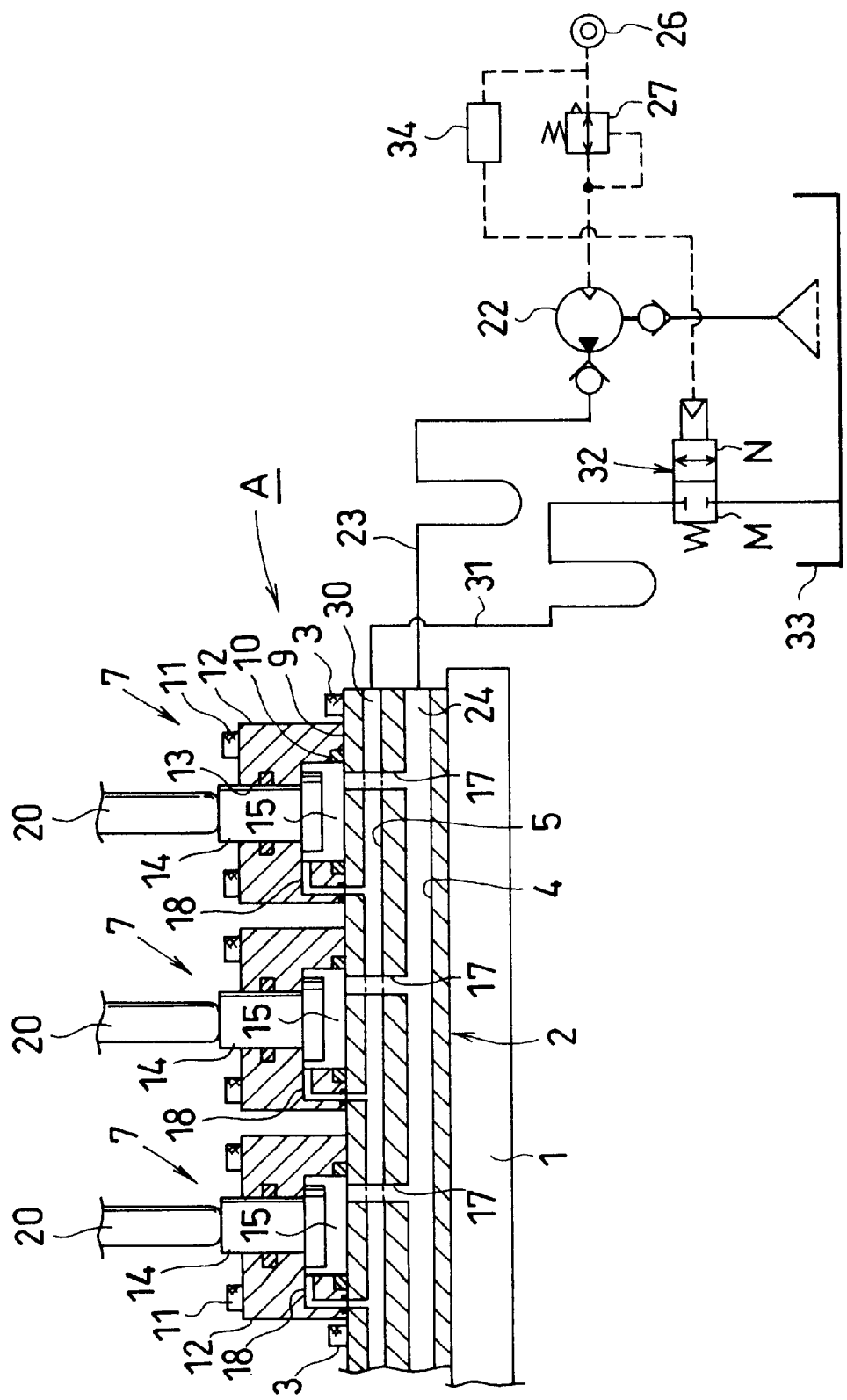
FIG. 1 is a systemic view of a hydraulic system provided with a cylinder assembly according to the present invention.

First, explanation is given for a structure of a hydraulic system provided with the cylinder assembly (A) by resorting to the systemic view of FIG. 1.

A manifold 2 is placed on an upper surface of a cushion pad 1 which is a support pedestal. The manifold 2 is fixed to the cushion pad 1 by a plurality of hexagon socket head cap screws 3. The manifold 2 is formed with a first passage 4 for supplying pressurized oil and a second passage (another passage) 5 for air venting both of which extend in a horizontal direction. A large number of hydraulic cylinders 7 are detachably attached to the manifold 2. FIG. 1 shows only three of the hydraulic cylinders 7.

Each of the hydraulic cylinders 7 is constructed in the following manner.

The manifold 2 has a support surface 9 to which a housing 12 is hermetically fixed through a sealing member 10 and a plurality of hexagon socket head cap screws 11. The housing 12 has a cylinder bore 13, into which a piston 14 is hermetically inserted. Formed between the piston 14 and the support surface 9 is a hydraulic chamber 15. The hydraulic chamber 15 directly opposes to the support surface 9.

Further, the manifold 2 has an interior area formed with branched passages 17 which extend in a vertical direction. The hydraulic chamber 15 communicates with the first passage 4 through one of the branched passages 17. Besides, the housing 12 has an interior area formed with an air vent passage 18. The air vent passage 18 has a lower end communicated with the second passage 5 and has an upper end communicated with an upper portion of the hydraulic chamber 15.

The cushion pad 1 is pushed upwards by a pneumatic holddown load applying means (not shown). In addition, a holddown die (not shown) is arranged on an upper side of the cylinder assembly (A). A large number of cushion pins 20 are arranged between the holddown die and the large number of pistons 14. These cushion pins 20 are arranged in such a number that is approximately within a range of some tens to two hundred per die cushion apparatus, although it changes depending on the capacity and type of a press machine.

A pneumatic-hydraulic booster pump 22 of a hydraulic source discharges pressurized oil which is supplied to an inlet 24 of the first passage 4 via a supply pipe 23. The booster pump 22 can change its discharging pressure through adjusting a pressure of compressed air of a pneumatic source 26 by a pressure reducing valve 27 to a predetermined one.

The second passage 5 has an outlet 30 connected to an oil reservoir 33 via a discharge pipe 31 and a hydraulic change-over valve 32. The hydraulic change-over valve 32 is changed over between a closed position (M) and an opened position (N) by a pneumatic change-over valve 34.

The hydraulic system is used as follows.

When starting to use the die cushion apparatus, first the hydraulic change-over valve 32 is changed over to the opened position (N). In that state the booster pump 22 is made to commence its operation. Then pressurized oil discharged by the booster pump 22 is vigorously supplied to the respective hydraulic chambers 15 via the first passage 4 and the respective branched passages 17. The supplied pressurized oil discharges air within the first passage 4, the branched passages 17 and the hydraulic chambers 15 to the oil reservoir 33 through the air vent passages 18, the second passage 5, the discharge pipe 31 and the hydraulic change-over valve 32 in the mentioned order.

When the air venting has been completed, the hydraulic change-over valve 32 is changed over from the opened position (N) to the closed position (M). Then the hydraulic chamber 15 has its pressure increased. The pressurized oil of the hydraulic chamber 15 having the thus increased pressure receives the cushion pin 20 with a predetermined force. This absorbs longitudinal dimension errors of many cushion pins 20 as well as frame strain and slide strain of a press machine during its press working to result in the possibility of improving the working accuracy of the press machine.

Figure 2:
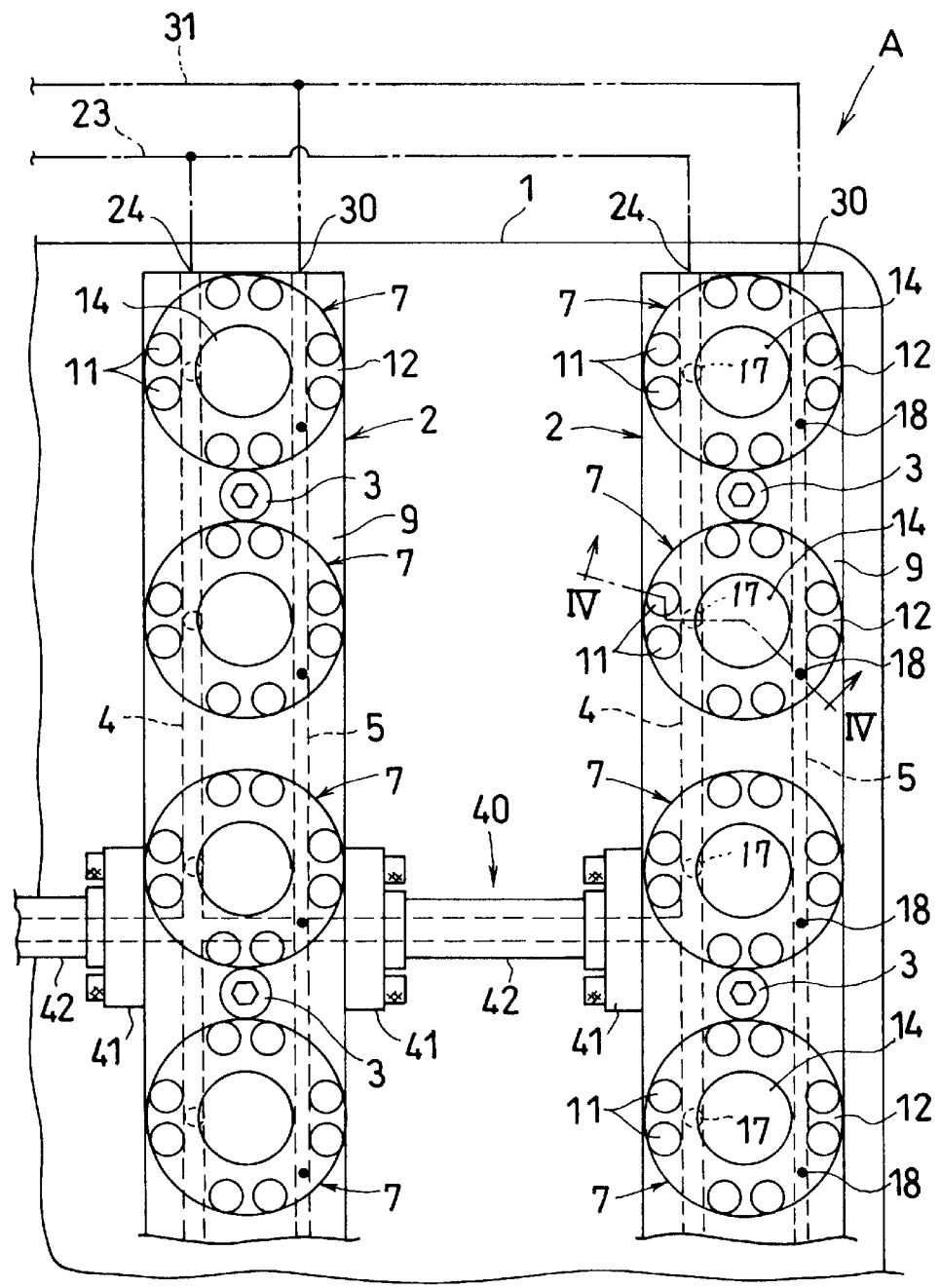
FIG. 2 is a partial view of the cylinder assembly when seen in plan.
Figure 3:
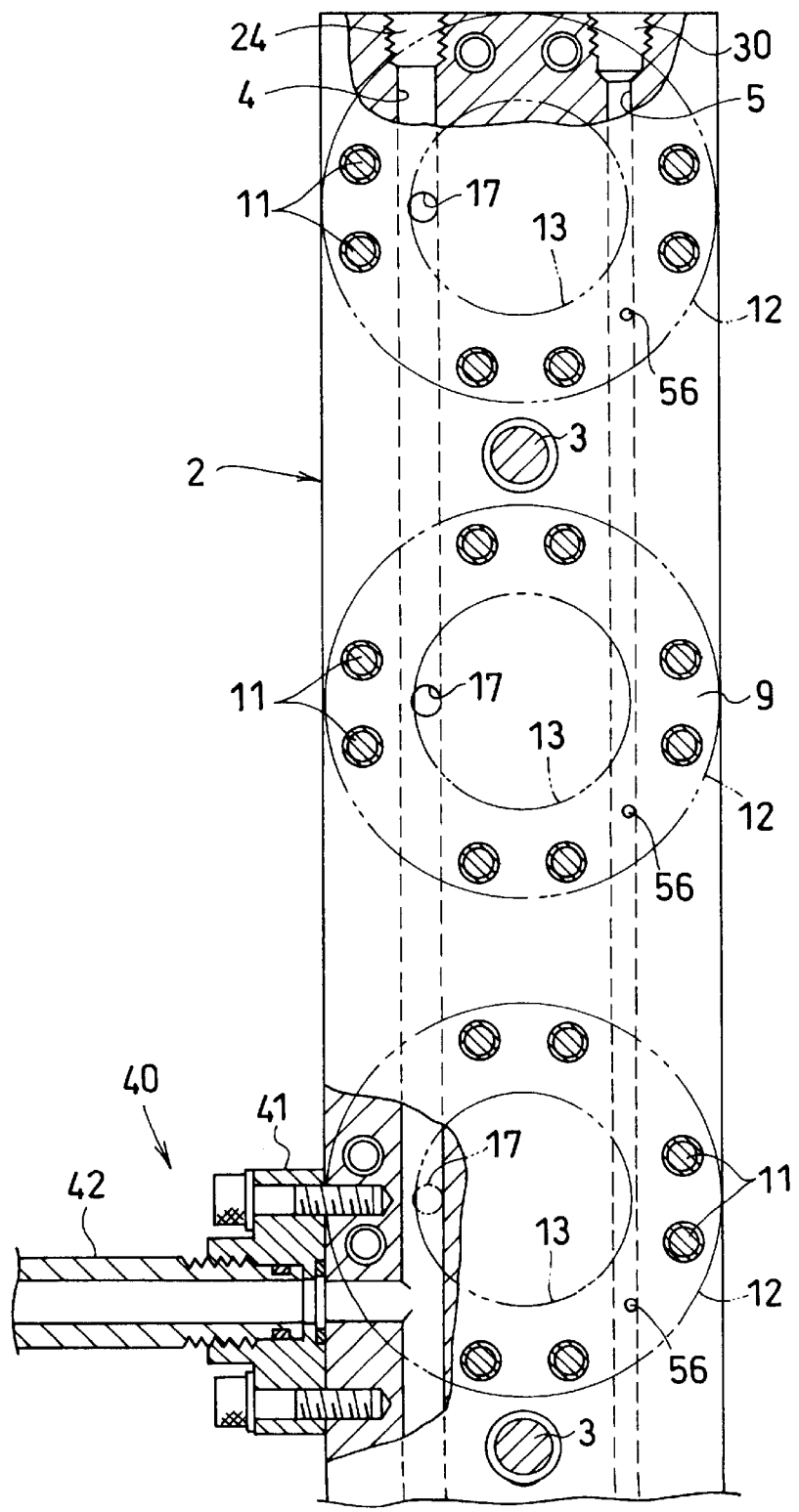
FIG. 3 shows a plan view of a manifold of the cylinder assembly and corresponds to a view when seen along a line III—III in a direction indicated by arrows in FIG. 4.
Figure 4:
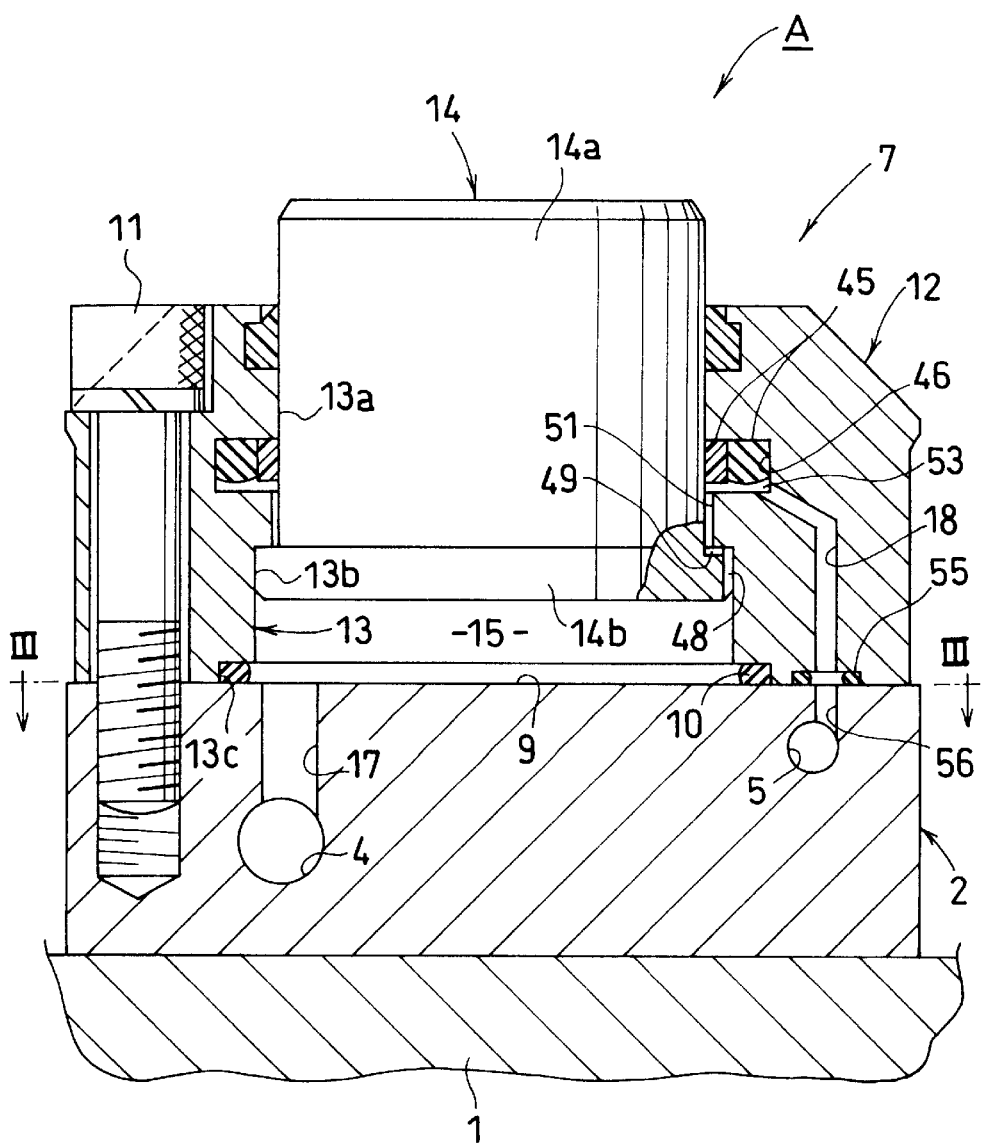
FIG. 4 shows a vertical sectional view of a hydraulic cylinder of the cylinder assembly and corresponds to a view when seen along a line IV—IV in a direction indicated by arrows in FIG. 2.

Next, explanation is given for a concrete structure of the cylinder assembly (A) by relying on FIGS. 2 to 4 with reference to FIG. 1.

FIG. 2 is a partial view of the cylinder assembly (A) when seen in plan. FIG. 3 shows a plan view of the manifold 2 and corresponds to a view when seen along a line III—III in a direction indicated by arrows in FIG. 4. FIG. 4 shows a vertical sectional view of the hydraulic cylinder 7 and corresponds to a view when seen along a line IV—IV in a direction indicated by arrows in FIG. 2.

The manifold 2 is placed on the upper surface of the cushion pad 1 in plural number and each of the manifolds 2 is detachably attached thereto by the plurality of hexagon socket head cap screws 3. The manifold 2 has a lower portion formed with the first passage 4 which extends horizontally and has an upper portion formed with the second passage 5 which also extends horizontally. The second passage 5 is formed smaller than the first passage 4 in diameter.

The first passage 4 has opposite end surfaces provided with the inlets 24 each of which is internally threaded. Here only one of the inlets 24 is illustrated. The inlet 24 is connected to the booster pump 22 through the supply pipe 23 (see FIG. 1).

The second passage 5 also has opposite end surfaces provided with the outlets 30 each of which is internally threaded. Here only one of the outlets 30 is illustrated. The outlet 30 is connected to the hydraulic change-over valve 32 through the discharge pipe 32 (see FIG. 1).

Further, a communication means 40 is provided between side surfaces of adjacent manifolds 2,2. The communication means 40 communicates longitudinal midway portions of the first passages 4,4 with one another. The communication means 40 comprises holding rings 41,41 detachably and hermetically fixed to the side surfaces of the manifolds 2 and a connecting pipe 42 provided between the adjoining holding rings 41,41.

The housing 12 of the hydraulic cylinder 7 has an annular shape and is detachably fixed to the manifold 2 by the plurality of hexagon socket head cap screws 11 (here eight ones). The cylinder bore 13 comprises a first bore 13a at its upper half portion, a second bore 13b at its lower half portion and a third bore 13c at its lower end. These three bores 13a, 13b and 13c gradually increase in diameter in the mentioned order.

The sealing member 10 which comprises an O-ring is attached to the third bore 13c. Hermetically inserted into the first bore 13a is a smaller-diameter portion 14a of the piston 14 through another sealing member 45. Numeral 46 designates an annular attaching groove. Further, inserted into the second bore 13b is a larger-diameter portion 14b of the piston 14.

The hydraulic chamber 15 is formed between the support surface 9 of the manifold 2 and the piston 14. In other words, a front wall portion of the support surface 9 also serves as a lower end wall of the hydraulic chamber 15.

Each of the branched passages 17 extends upwards from the first passage 4. And it has an upper end opened into the support surface 9 and communicated with the hydraulic chamber 15.

The hydraulic chamber 15 has an upper portion communicated with the second passage 5 through the air vent passage 18 which extends vertically. More specifically, the hydraulic chamber 15 has a lower area communicated with a cavity 53 at a lower portion of the attaching groove 46 through an outer peripheral groove 48 and an upper surface groove 49 of the larger-diameter portion 14b , of the piston 14, and a diametrically expanded portion 51 of the first bore 13a in the mentioned order. The cavity 53 communicates with an upper end of the air vent passage 18. The air vent passage 18 has a lower end hermetically communicated with a hole 56 branched from the second passage 5 through an O-ring 55.

The above-mentioned air venting structure can collect air within the hydraulic cylinder 7 into the cavity 53 positioned downwards of the another sealing member 45 and discharge the collected air to the outside oil reservoir 33 through the second passage 5 with the pressurized oil supplied to the hydraulic chamber 15. In consequence, this has made it possible to expel the air within the cylinder assembly (A) substantially completely.

In addition, a large flow resistance can be applied to the pressurized oil supplied when effecting the above air venting, by a throttling action of the air vent passage 18 made radially smaller as well as by throttling actions of the outer peripheral groove 48 and the upper surface groove 49. This can supply the pressurized oil to the large number of hydraulic chambers 15 substantially uniformly. As a result, the cylinder assembly can be air vented evenly.

The above embodiment can be modified as follows.

Although the upper end of the air vent passage 18 preferably communicates with the uppermost portion of the hydraulic chamber 15 as exemplified, in the case where the booster pump 22 discharges the pressurized oil in a sufficiently large amount, it may communicate with an upper side portion or a mid height portion of the hydraulic chamber 15.

The second passage 5 and the hydraulic change-over valve 32 may be removed, Instead, an air vent valve may be provided for every hydraulic cylinder 7.

All the inlets 24 of the first passage 4 may be closed by plugs and the pressurized oil may be supplied from the communication pipe 42.

The hydraulic cylinder 7 is not limited to the exemplified type, but it may be formed into a structure of spring-return type or double-acting type. In the case of a hydraulic cylinder of double-acting type, two passages for supplying and discharging pressurized oil are provided within the manifold. When pressurized oil is supplied to one of the passages, the other can be employed as a discharge passage for air venting.

The cylinder assembly (A) of the present invention is applicable to other kinds of apparatuses instead of the exemplified die cushion apparatus.

What is claimed is:

1. A cylinder assembly comprising:
    a manifold (2) having a passage (4) to which pressurized oil is supplied and a support surface (9);
    a plurality of hydraulic cylinders (7) being detachably attached to the manifold (2);
    each of the hydraulic cylinders (7) comprising a housing (12) hermetically fixed to the support surface (9), a piston (14) hermetically inserted into the housing (12), and a hydraulic chamber (15) which is formed between the piston (14) and the support surface (9), and directly opposes to the support surface (9); and
    branched passages (17) each of which has one end and the other end, and is provided within the manifold (2), the one end of every branched passage (17) communicating with the passage (4) and the other end communicating with the hydraulic chamber (15).

2. The cylinder assembly as set forth in claim 1 further comprising:
    another passage (5) formed in the manifold (2); and
    an air vent passage (18) which has one end and the other end, and is provided within the housing (12), the one end of the air vent passage (18) communicating with the another passage (5) and the other end communicating with an upper portion of the hydraulic chamber (15).

3. The cylinder assembly as set forth in claim 2 further comprising:
    a cylinder bore (13) formed in the housing (12) so as to receive the piston (14);
    an annular attaching groove (46) formed in the cylinder bore (13);
    a sealing member (45) attached to the attaching groove (46) so as to seal the piston (14); and
    a cavity (53) formed on a lower side of the sealing member (45) within the attaching groove (46) and communicating with the other end of the air vent passage (18).

4. The cylinder assembly as set forth in claim 2 further comprising:
    a flow resistance applying means (48,49) provided in at least one of the upper portion of the hydraulic chamber (15) and the air vent passage (18).

5. The cylinder assembly as set forth in claim 3 further comprising:
    a flow resistance applying means (48,49) provided in at least one of the upper portion of the hydraulic chamber (15) and the air vent passage (18).

* * * * *